(12) United States Patent
Vellidus et al.

(10) Patent No.: US 6,525,276 B1
(45) Date of Patent: Feb. 25, 2003

(54) CROP YIELD MONITORING SYSTEM

(75) Inventors: George Vellidus, Tifton, GA (US); Jeffrey S. Durrence, Moultrie, GA (US); Rodney W. Hill, Tifton, GA (US); Calvin D. Perry, Moultrie, GA (US); Daniel L. Thomas, Tifton, GA (US); Takoi K. Hamrita, Bogart, GA (US)

(73) Assignee: The University of Georgia Research Foundation, Inc., Athens, GA (US)

( * ) Notice: Subject to any disclaimer, the term of this patent is extended or adjusted under 35 U.S.C. 154(b) by 0 days.

(21) Appl. No.: 09/366,975

(22) Filed: Aug. 4, 1999

Related U.S. Application Data
(60) Provisional application No. 60/095,779, filed on Aug. 7, 1998.

(51) Int. Cl.[7] .................. G01G 23/42; G01G 19/08; G01G 19/14; G06F 19/00; A01C 15/00
(52) U.S. Cl. .................. 177/136; 177/25.19; 701/50; 702/174
(58) Field of Search .................. 177/136, 137, 177/138, 139, 141, 25.11, 25.13, 25.19; 702/173, 174; 701/50

(56) References Cited

U.S. PATENT DOCUMENTS

| | | | | |
|---|---|---|---|---|
| 3,990,032 A | * | 11/1976 | Fish et al. ............ | 177/136 |
| 4,362,097 A | * | 12/1982 | Rogers et al. ......... | 177/136 |
| 4,411,325 A | * | 10/1983 | Hamilton ............. | 177/136 |
| 5,870,686 A | * | 2/1999 | Monson .............. | 701/50 |
| 5,959,257 A | * | 9/1999 | Campbell et al. ...... | 177/25.19 |
| 6,013,880 A | * | 1/2000 | McFarlane et al. ..... | 177/139 |
| 6,066,809 A | * | 5/2000 | Campbell et al. ...... | 177/25.19 |
| 6,150,617 A | * | 11/2000 | Hart et al. ........... | 177/25.13 |

OTHER PUBLICATIONS

"Mapping the High–Tech Future of Farming", Agrisearch, Spring/Summar, 1995, pp. 6–7 by H. Fosgate.
"Yield Monitors", The Peanut Farmer, pp. 10–12, Jul., 1995 by Cecil Yancy.

(List continued on next page.)

*Primary Examiner*—Randy W. Gibson

(57) ABSTRACT

A peanut combine towed and powered by a tractor during harvesting includes a collection basket having a basket support frame mounted on the top of the combine by four load cells. A respective load cell is located beneath each lower bottom corner of the base of the collection basket between the support frame and a support member, such as a steel support channel, fastened on the top of the combine. The load cells produce analog data signals representative of weight of the collection basket at any given instance as the crop is harvested. The load cells transmit data analog signals to a data acquisition system (DAS) via a summing device and anti-aliasing filter. The DAS includes a CPU and an analog to digital converter to convert the analog load cell data to digital signals and digitally filters the digital signal to reduce signal noise resulting from harmonic vibrations of the combine straw walker mechanism for further processing. The CPU is interfaced with a global positioning device that provides time, latitude and longitude information of the combine to the CPU and also with a sensor that inputs tractor/combine information to the CPU from which combine speed can be determined. An interface device is provided on the tractor and interfaces to the CPU for providing signals representative of the number of rows harvested (row counter) to the CPU as input by the tractor operator. The CPU includes software for determining the instantaneous crop yield, yield rate, and area harvested as a crop field is being harvested for display to the tractor operator.

20 Claims, 17 Drawing Sheets

OTHER PUBLICATIONS

Durrence, Jeffrey Stuart, *Digital Signal Processing Techniques for a Load Cell Peanut Yield Monitoring System*, M.S. Thesis, University of Georgia, Athens, Georgia 1997 (pp. 40–87, plus cover).

Perry, C.D.; Thomas, D.L.; Vellidis, G.; Durrence, J.S.; Kutz, L.J.; Kvien, C.K., *Integration and Coordination of Multiple Sensor and GPS Data Acquisition for Precision Farming Systems*, ASAE Technical Paper No. 97–3143, presented at 1997 ASAE International Meeting, Minneapolis, MN, Aug. 10–14, 1997 (21 pages).

Thomas, D.L.; Perry, C.D.; Vellidis, G.; Durrence, J.S.; Kutz, L.J.; Kvien, C.K.; Boydell, B.; Hamrita, T.K., *Development and Implementation of a Load Cell Yield Monitor for Peanut*, ASAE Technical Paper No. 97–1059, presented at 1997 ASAE International Meeting, Minneapolis, MN, Aug. 10–14, 1997 (27 pages).

Perry, Calvin D.; Durrence, Jeffrey S.; Vellidis, George; Thomas, Daniel L.; Hill, Rodney W.; Kvien, Craig S., *Field Experiences with a Prototype Peanut Yield Monitor*, ASAE Technicla Paper No. 98–3095, presented at 1998 ASAE International Meeting, Orlando, FL, Jul. 12–16, 1998 (11 pages).

Durrence, J.S.; Perry, C.D.; Hamrita, T.K.; Thomas, D.L.; Vellidis,G.; Kvien, C.K., *Digital Signal Processing Techniques For Optimizing a Load Cell Peanut Yield Monitor*; ASAE Technical Paper No. 97–3009 presented at the 1997 ASAE International Meeting, Minneapolis, MN, Aug. 10–14, 1997 (31 pages).

Bader, Mike, *Peanut Diggers and Combines*, Cooperative Extension Service, University of Georgia College of Agricultural and Environmental Sciences, Athens, GA, reprinted Oct., 1995 (4 pages).

Freeland, R.S.; Tompkins, F.D.; Wilhelm, L.R.,*Keeping Test Errors Within Acceptable Limits*, "Agricultural Engineering", Mar./Apr. 1997 (pp. 13–15).

Brown III, Fred, *Analyzing Time and Frequency Domain Data in Real Time or Postprocess*, "Sensors", Feb. 1996 (pp. 37–40).

Cole, Gregory P.; Peterson, J. Shawn, *Developing a Rugged and Portable Data Acquisition System for the Field*, "Sensors", Feb., 1996 (pp. 33–36).

Birrell, Stuart J.; Sudduth, Kenneth A.; Borgelt, Steven C., *Comparison of Sensors and Techniques for Crop Yield Mapping*, Elsevier Computers and Electronics in Agriculture 14 (1996) (pp. 215–233).

Reitz, P.; Kutzbach, H.D., *Data Acquisition for Yield Mapping with Combine Harvesters*, Proceedings of the 5th International Conference, Computers in Agriculture 1994, Feb. 6–9, 1994, pub. American Society of Agricultural Engineers (pp. 42–47, plus cover).

Elliott, Paul W.; Haghighi, Kamyar; Krutz, Gary W.; Morgan, Mark T.; Bernard, Robert J., *Evaluation of Dynamic Noise Sources in a Real–Time Soil Sensor*, ASAE Technical Paper No. 94–1579, presented at 1994 ASAE International Meeting, Atlanta, GA, Dec. 13–16, 1994 (10 pages).

Eliason, M.; Heaney, D.; Goddard, T.; Green, M.; McKenzie, C.; Penney, D.; Gehue, H.; Lachapelle, G.; Cannon, M.E., *Yield Meaurement and Field Mapping with an Integrated GPS System*, 1995 ASA–CSSA–SSSA, May 25, 1995, (pp. 49–57, with cover sheet).

Birrell, Stuart J.; Borgelt, Steven C.; Sudduth, Kenneth A., *Crop Yield Mapping: Comparison of Yield Monitors and Mapping Techniques*, 1995 ASA–CSSA–SSSA, (pp. 15–31).

Thylen, Lars; Murphy, Donal P.L., *The Control of Errors in Momentary Yield Data from Combine Harvesters*, 1996 Silsoe Research Institute, No. 0021–8634/96/080271 + 08 (pp. 271–278).

Perez–Munoz, F.; Colvin, T.S., *Continuous Grain Yield Monitoring* 1996 American Society of Agricultural Engineers, vol. 39(3): (pp. 775–783).

Lark, R.M.; Stafford, J.V.; Bolam, H.C., *Limitations on the Spatial Resolution of Yield Mapping for Combinable Crops*, 1997 Silsoe Research Institute, J. agric. Engng Res. (1997) 66 0021–8634/97/030183 +11 (pp. 183–193).

Hollist, Ray; Wollman, Albert; Campbell, Robert, *No Small Potatoes: Monitoring the Yield of High–Value Crops*, "Precision Farming", Jul., 1996 (pp. 4, 6, 24–28).

Walter, J.D., Hofman, V.L.; Backer, L.F., *Site–Specific Sugarbeet Yield Monitoring*, 1996 ASA–CSSA–SSSA (pp. 835–844).

Rawlins, Stephen L.; Campbell, Gaylon S.; Campbell, Ronald L.; Hess, John R., *Yield Mapping of Potato*, 1995 ASA–CSSA–SSSA from Site Specific Management for Agricultural Systems (pp. 59–67 plus cover).

Wagner, L.E.; Schrock, M.D., *Yield Determination Using a Pivoted Auger Flow Sensor*, 1989 American Society of Agricultural Engineers, vol. 32(2), Mar./Apr. 1989 (pp. 409–413).

Vansichen, R.; DeBaerdemaeker, J., *A Measurement Technique for Yield Mapping of Corn Silage*, 1993 Silsoe Research Institute, J. agric. Engng Res. (1993) 55, 0021–8634/93/05001 + (pp. 1–10).

Hall, Thomas; Hofman, Vernon L.; Backer, Leslie F.; Smith, Larry J., *Monitoring Sugarbeet Yield on a Harvester*, ASAE Technical Paper No. 97–3139, present at 1997 ASAE International Meeting, Minneapolis, MN, Aug. 10–14, 1997 (13 pages).

Behme, Jeffrey A.; Bashford, Leonard L.; Schinstock, Jack L.; Leviticus, Louis I., *Site–Specific Yield for Forages*, ASAE Technical Paper No. 97–1054, presented at 1997 ASAE International Meeting Minneapolis, MN, Aug. 10–14, 1997 (25 pages).

Campbell, Ronald H.; Rawlins, Stephen L.; Han, Shufeng, *Monitoring Methods for Potato Yield Mapping*, ASAE Technical Paper No. 94–1584, presented at 1994 International Meeting, Atlanta, GA, Dec. 13–16, 1994 (21 pages).

Wild, K.; Auernahammer, H.; Rottmeier, J.,*Automatic Data Acquisition on Round Balers*, ASAE Technical Paper No. 94–1582, presented at 1994 ASAE International Meeting, Atlanta, GA Dec. 13–16, 1994 (15 pages).

Godwin, R.J.; Wheeler, P.N., *Yield Mapping by Mass Accumlation Rate*, ASAE Technical Paper No. 97–1061, presented at 1997 ASAE International Meeting, Minneapolis, MN, Aug. 10–14, 1997 (10 pages).

Ess, D.R.; Joern, B.C.; Hawkins, S.E., *Development of a Precision Application System for Liquid Animal Manures*, Purdue University, (pp. 863–870).

\* cited by examiner

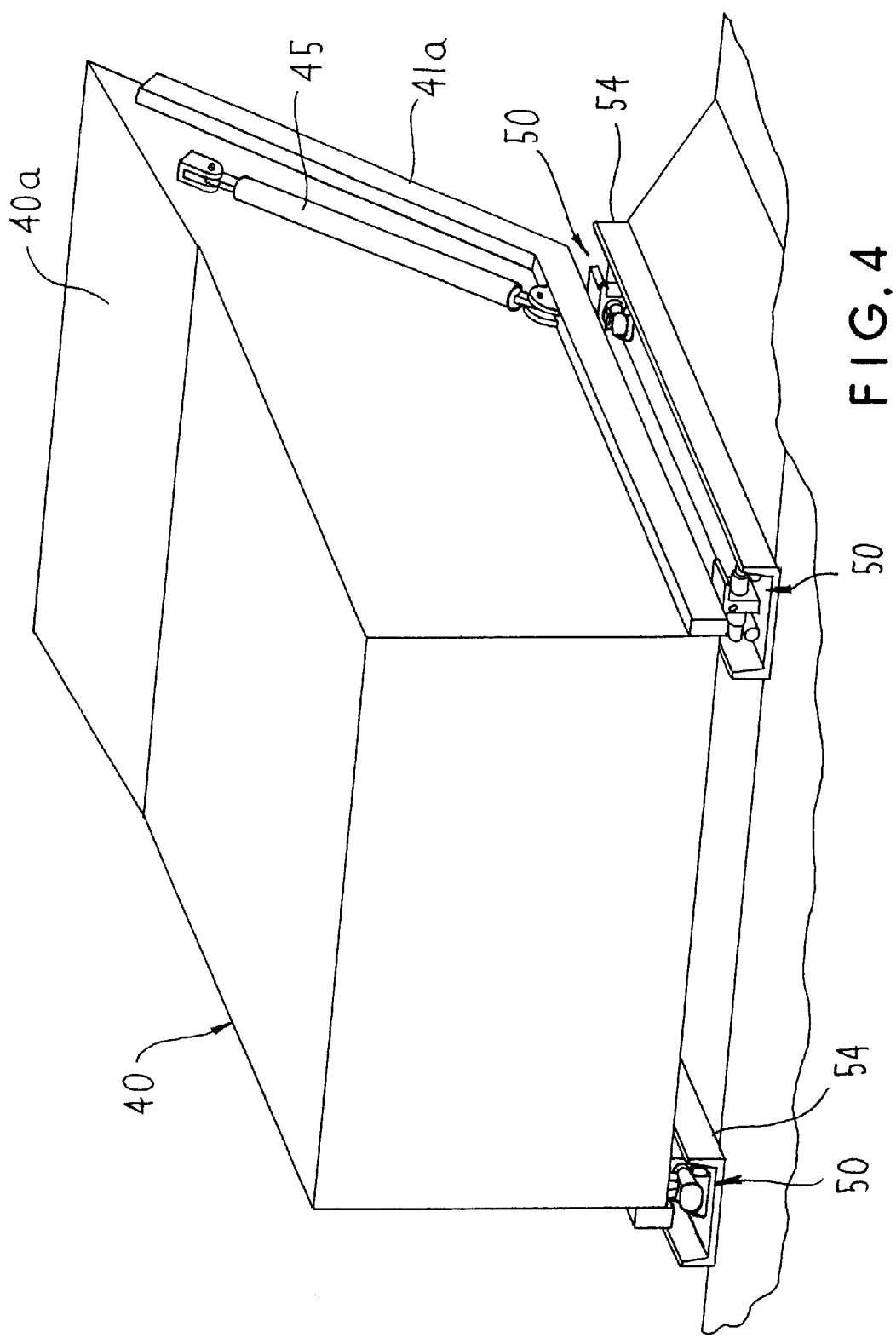

```
%PYMS CPU Program (skeleton prototype)

%Values obtained during calibration procedure.
speed_coef = 28.4342;
yield_coef = 251.43442;
dead_wt = 3150.00;
%Value obtained from PIOD
rows = '10';                    %String with binary number of rows.
%Values parsed from GPS string
gps_time = '143522.0'; %Time format is hhmmss.ss
latitude = '3143.4454';         %Coordinate format is DDMM.MMMM
longitude = '08369.2212';       %Coordinate format is DDDMM.MMMM %Program body:
init_speed;                     %Initialize speed function to run simultaneously
sum = 0.0;
for i = 1:256  %For loop to average load cell output over sample interval.
        result = convert(load_cell);   % Convert is the A/D function.
        sum = sum+result;
end
raw_yield = sum/256;

%Median filter implementation.
%The vector named "buffer" contains the last eleven raw yield calculations.
%The values in buffer have been sorted from lowest to highest in value.
rank = 1;                               %Initial rank value
for i =  1:11
        if (raw_yield < buffer(i))
                break;                  %Terminates for loop early.
        end                             %end of if statement
end                                     %end of for loop
rank = i;                  %Rank of raw_yield relative to the buffer values.
if(rank-=11)
        for i=10:-1:rank        %for loop shifts buffer values to place new value.
                buffer(i) = buffer(i+1);
        end
        buffer(rank) = raw_yield;       %latest value placed appropriately.
else                                    %condition: rank = 11
        buffer(rank) = raw_yield;
end                                     %end of if/else statements
yield = yield_coef*buffer(6)-dead_wt; %Note median value of buffer is used.
num_rows= bin2dec(rows);                %Convert binary string to integer.
term_speed;                             %Terminate speed function, return
speed value.
speed = speed_coef*speed;
output = sprintf("%s,%s,%s,%.6f,%.6f,%d",gps_time,latitude,longitude,
                              yield,speed,num_rows);
transmit(output);    %Function sends output string to storage/display unit.
%End of Program Body
```

Figure 6. Core program of PYMS CPU written in MATLAB programming language (MATLAB is a registered trademark of The MathWorks, Inc.).

```
%Core PYMS Display/Storage Program

%Parameters entered in calibration procedure (typical):
speed_coef = 28.4342;
yield_coef = 251.43442;
dead_wt = 3150.00;          %Weight of empty basket in lb.
row_spacing = 36;           %Spacing units are inches.
wagon_id = 3445;            %Wagon identification number.
sample_rate = 1;            %Sampling interval in seconds.

%Parameters received from CPU vis RS-232:
latitude = 3143.4454;       %Coordinate format is DDMM.MMMM
longitude = 08369.2212;     %Coordinate format is DDDMM.MMMM
speed = 3.789565;           %Speed in units of mph
yield = 7.495679;           %Yield in lb
num_rows = 2;               %Number of windrows %Program Body
if (num_rows~=0)
        distance =    speed*5280/3600*sample_rate;           %distance in feet
        area = distance*(num_rows*row_spacing/12)/43560;     %area in acres
        yield_rate = yield/area;                             %rate in lb/ac
        total_area = total_area +area;
        total_yield = total_yield+yield;
        display(rate,total_yield,total_area);
        fprintf(file1,"%s,%s,%s,%.6f,%.6f,%.6f,%.6f,%.6f",gps_time,
                latitude,longitude,yield,area,yield_coef,speed_coef,dead_wt);
end;
```

Figure 7. Core program of PYMS Display/Data Storage unit written in MATLAB programming language.

PEANUT PROFIT MAP OF S& S FARMS FIELD 10
CREATED FROM THE YIELD MAP (SEE NEXT FIGURE) BY
SUBTRACTING PRODUCTION COSTS FROM YIELD INCOME

US 6,525,276 B1

CROP YIELD MONITORING SYSTEM

This application claims the benefits of provisional application Serial No. 60/095,779 filed Aug. 7, 1998.

FIELD OF THE INVENTION

The present invention relates to a crop yield monitoring system and method for use during harvesting of a crop.

BACKGROUND OF THE INVENTION

Load cells, such as strain gage load cells, have been used in development of yield monitors for harvesting grains, forage, potato, and sugar beet. For example, Birrell et al. in "Comparison of sensors and techniques for crop yield mapping", Computers and Electronics in Agriculture, 14:215–33, 1996, used a catch bin situated in a clean grain tank to provide a comparison to the grain yield indicated by commercial monitors. Wagner and Schrock in "Yield Determination Using Pivoted Auger Flow Sensor", Transactions of the ASAE, 32(2): 409–13, 1989, replaced an existing clean grain elevator with a triangular auger system to provide a horizontal section of flowing grain. This horizontal section was supported on one end by a pin connection and on the other end by a load cell. The load cell provided instantaneous weight measurements which were used to derive material flow rate.

Rawlins et al. in "Yield Mapping of Potato", In-Sitespecific Management for Agricultural Systems, 59–68, Madison, Wis., ASA-CSSA-SSSA 1995, and Campbell et al. in "Monitoring Methods for Potato Yield Mapping", ASAE paper #94–1584, St. Joseph, Mich., 1994, developed a system in which a section of a conveyor on a potato harvester was supported by load cells integrated into idler wheel mounts. In this system, instantaneous conveyor section weights and conveyor speed measurements were used to obtain mass flow rate of potato which was referenced to position data simultaneously collected with a global position system receiver. This yield monitor, now commercially available as the HarvestMaster monitor from HarvestMaster, Inc. Logan, Utah, is used for sugar beet and potato yield monitoring.

Yield monitoring of forage was attempted and described by Wild et al. in "Automatic Data Acquistion on Round Balers", ASAE Paper #94–1582, St. Joseph, Mich. 1994. A round baler was equipped with load cells that monitored the weight of the entire machine as the forage was collected. Preliminary results showed that individual bale weights could be accurately determined under static conditions, but excessive noise severely limited real time yield measurements. The tractor and baler also were instrumented with accelerometers to monitor vibration. Acceleration thresholds were used to screen data for real-time measurement, but the signal noise remained a severe limitation to forage yield monitoring.

Machine vibration is an unfortunate but real characteristic of all harvesting equipment. Rotating shafts and other undulating parts drive the cutting, threshing and transport operations within both self-propelled and tractor-driven combines. Any sensor installed within a combine must be able to endure vibration, and the data acquisition system or subsequent analysis must likewise be able to produce usable data from the sensor output. Strain-gage based sensors are particularly sensitive to vibration.

Spectral analysis provides a useful method for evaluating machine vibrations. These techniques were used by Wagner and Schock in aforementioned "Yield Determination Using Pivoted Auger Flow Sensor", Transactions of the ASAE, by Pringle et al. in "Yield Variation in Grain Crops", ASAE paper #93–1505, St. Joseph, Mich. 1993, and by Elliot et al. in "Evaluation of Dynamic Noise Sources in a Real-Time Soil Sensor", ASAE paper 394–1579, St. Joseph, Mich., 1994, to determine the needed sampling rate and the characteristics of the filters to be used.

Analog filtering techniques to remove vibration and other electrical noise in yield monitoring systems are presented by DeBaerdemaeker et al. in "Monitoring the Grain Flow on Combines", Agri-Mation 1. ASAE, 329–338, 1985, by Vansichen et al. in "A Measurement Technique for Yield Mapping of Corn Silage", Journal of Agricultural Engineering Research, 55:1–10, 1993, by Pringle et al, in aforementioned "Yield Variation in Grain Crops", ASAE paper #93–1505, by Vansichen et al. in "Continuous Wheat Yield Measurement on a Combine", Automated Agriculture for the 21st Century, ASAE, 346–355 1991, and by Schrock et al. in "Sensing Grain Yield with a Triangular Elevator", Site-Specific Management for Agriculture Systems, ASA-CSSA-SSSA, 1995.

Digital filtering techniques were used in yield monitoring research by Wagner and Schock in aforementioned "Yield Determination Using Pivoted Auger Flow Sensor", Transactions of the ASAE, by Vansichen et al. in aforementioned "Continuous Wheat Yield Measurement on a Combine", Automated Agriculture for the 21st Century, ASAE, by Birrell et al. in aforementioned "Comparison of sensors and techniques for crop yield mapping", Computers and Electronics in Agriculture, by Pringle in aforementioned "Yield Variation in Grain Crops", ASAE paper #93–1505, by Vansichen et al. in aforementioned in "A Measurement Technique for Yield Mapping of Corn Silage", Journal of Agricultural Engineering Research, and by Murphy in "Yield Mapping-A Guide to Improved Techniques and Strategies", Site-Specific Management for Agricultural Systems, 33–47, ASA-CSSA-SSSA, 1995.

Yield monitoring studies have recognized a problem of delay, or lag, between the moment that the crop enters the combine and the moment that it is sensed. If no compensation technique is used to correct or minimize this problem, the spatial representation of the yield data will be misleading. Lamb et al. report in "Perils of Yield Monitoring on the Go" in Proceedings of the Second International Conference on Site Specific Management for Agricultural Systems, Madison Wis.: ASA-CSSA-SSSA, 1995, that a time lag of 15 seconds with the average harvest speed of 5.1 km/h (3.2 mi/hr) will displace true yield data by as much as 20.1 meters (66 feet). Searcy et al. in "Mapping of Spatially variable Yield During Grain Combining" in Transactions of the ASAE, 32 (3):826–9, 1989, proposed mathematical models to reconstruct the actual yield data from the measured yield data. They used a first order transfer function model and considered the combine as a lumped parameter system. Also see Vansichen and De Baerdemaeker article entitled "A Measurement Technique for Yield Mapping of Corn Silage" in Journal of Agricultural Engineering Research, 55:1–0, 1991. Birrell and Borgelt in "Crop Yield Mapping: Comparison of Yield Monitors and Mapping Techniques" in Site-Specific Management for Agricultural Systems, 15–31, Madison, Wis. ASA-CSSA-SSSA, 1995, experimented with both simple delay and the transfer function model. Their results showed that the transfer function was a better model for describing the "step" input of crop at the beginning of a row; however, the noise amplification involved in inverting the transfer function data from the frequency domain to the time domain reduced the usefulness of this method. Depending on the desired yield resolution (harvested crop per unit area), the added complexity of the transfer function may be counterproductive to the yield monitor design.

Yield monitoring systems have been developed for grain harvesting in order to promote precision farming operations. However, a yield monitoring system for harvesting peanuts is not available today in part due to the functionally different nature of peanut harvesting and peanut combines.

In particular, peanut plants are mechanically dug, the fruit (pods) and vines are shaken free of soil, and the whole plant inverted before being laid back on the soil surface. The peanut plants remain on the surface to cure (dry) to a moisture content suitable for harvest (e.g. less than 12–18%) and pod removal. With the dried peanut plants arranged in windrows, a peanut combine uses a pickup reel to harvest the windrows. The pickup reel feeds the cured plants onto a throat elevator where they are drawn through a series of rotating cylinders and sieves to separate the pods from the vines. The pods fall through the sieve into a collecting hopper where either a mechanical lateral floor auger or a fan moves them across the bottom of the combine and into an air duct. On all current peanut combines, the peanut pods are blown from the base of the combine through an air duct into a collecting basket on the top of the combine.

Because peanut pods are blown into the collecting basket atop the combine, existing grain yield monitoring systems are not directly applicable. For example, most of the current grain yield monitoring systems rely on a pulsed or continuous flow of grain from a lifting auger. Grain transported by an auger maintains a consistent speed relative to the auger and a force-based sensor can be used. The ability to calibrate grain impact on a sensor/plate to the auger speed has been shown to be a commercially acceptable means to monitor grain yield.

There thus is a need for a yield monitoring system and method for peanut combines and other similar harvesting machines where the harvested crop is transported into a collection basket or container.

It is an object of the present invention to satisfy this need.

SUMMARY OF THE INVENTION

The present invention provides a crop yield monitoring system and method based on measuring mass changes in a crop collection basket of a harvesting machine, such as a peanut combine, as a crop field is being harvested and including load cells supporting the collection basket and a data acquisition system for acquiring incremental load cell output and preferably using digital noise filtering to remove signal noise resulting from harmonic vibration of a one or more components of the harvesting machine, such as for example only, a straw walker mechanism of a peanut combine.

In an illustrative embodiment of the invention offered to illustrate and not limit the invention, a peanut combine towed by a tractor during harvesting includes a collection basket disposed on a pivotable support frame mounted on the top of the combine. The basket support frame is supported on four load cells mounted in rigid channels on the top of the combine. A respective load cell is located beneath and adjacent to each lower bottom corner of the collection basket between the support frame and the channels. The load cells produce analog data output or signals representative of weight of the collection basket at any given instance as the crop is harvested. The load cell output is provided to a data acquisition system (DAS) that includes a CPU (computer processor unit) via a signal summing device and an analog anti-alias filter. The DAS includes an analog-to-digital converter to convert the analog load cell output to digital output for further processing and digital filtering to remove signal noise attributable primarily to the straw walker of the combine. The CPU is interfaced with a global positioning system receiver that provides time, latitude and longitude information of the combine to the CPU and also with a sensor that inputs tractor/combine information to the CPU from which speed of the combine can be determined. An interface device is provided on the tractor and interfaces with the CPU for providing signals representative of the number of rows harvested to the CPU as input by the tractor operator. The CPU determines the instantaneous crop yield, crop yield rate and area harvested as a crop field is being harvested for display to the tractor operator.

The invention is advantageous to provide a crop yield monitoring system and method which can be used during harvesting of a crop, such as peanuts, pecans, Vidalia onions, and others, which are transported into a collection basket in order that crop yield can be determined based on measuring mass changes of the collection basket. The invention provides crop yield mapping data for evaluating crop yield at locations in a site-specific farming area. These advantages are obtained using load cells and other system components mounted in a manner for ready retrofitting on existing combines and also as original equipment on new combines.

The above and other objects and advantages of the present invention will become more readily apparent from the following detailed description taken with the following drawings.

DESCRIPTION OF THE DRAWINGS

FIG. 4 is schematic perspective view showing load cells and support channels on the top of the combine.

FIG. 6 is a diagram of the peanut yield monitoring software program for peanut yield monitoring system written in MATLAB programing language.

FIG. 7 is a diagram of software program for a display/storage unit of the peanut yield monitoring system written in MATLAB programming language.

DESCRIPTION OF THE INVENTION

Figure 1:
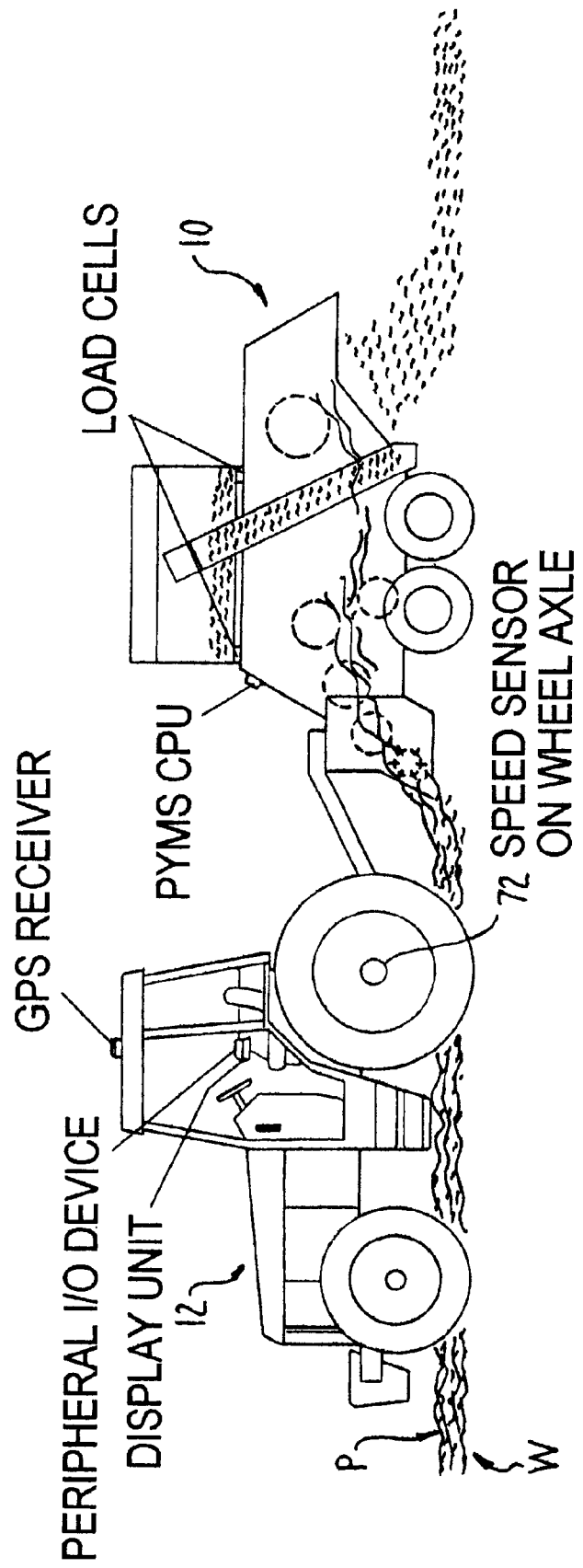
FIG. 1 is an elevational view of a tractor towing and powering a peanut combine having a crop collection basket mounted on the top of the combine using load cells in accordance with an embodiment of the invention.

Referring to FIG. 1, a peanut combine 10 is shown being towed and powered by a tractor 12 during harvesting of peanut plants P in a windrow W. Usually one or two windrows are harvested at the same time. The tractor can be any commercially available tractor suitable for towing the combine 10. For example only, the invention can be practiced using a John Deere model 7700 tractor available from John Deere Company, Moline, Ill. The combine likewise can comprise any commercially available peanut combine suitable for harvesting peanut plants. For example only, the invention can be practiced using a model 3355 4 Row wide Body peanut combine available from Kelley Manufacturing Company, Tifton, Ga.

Figure 5:
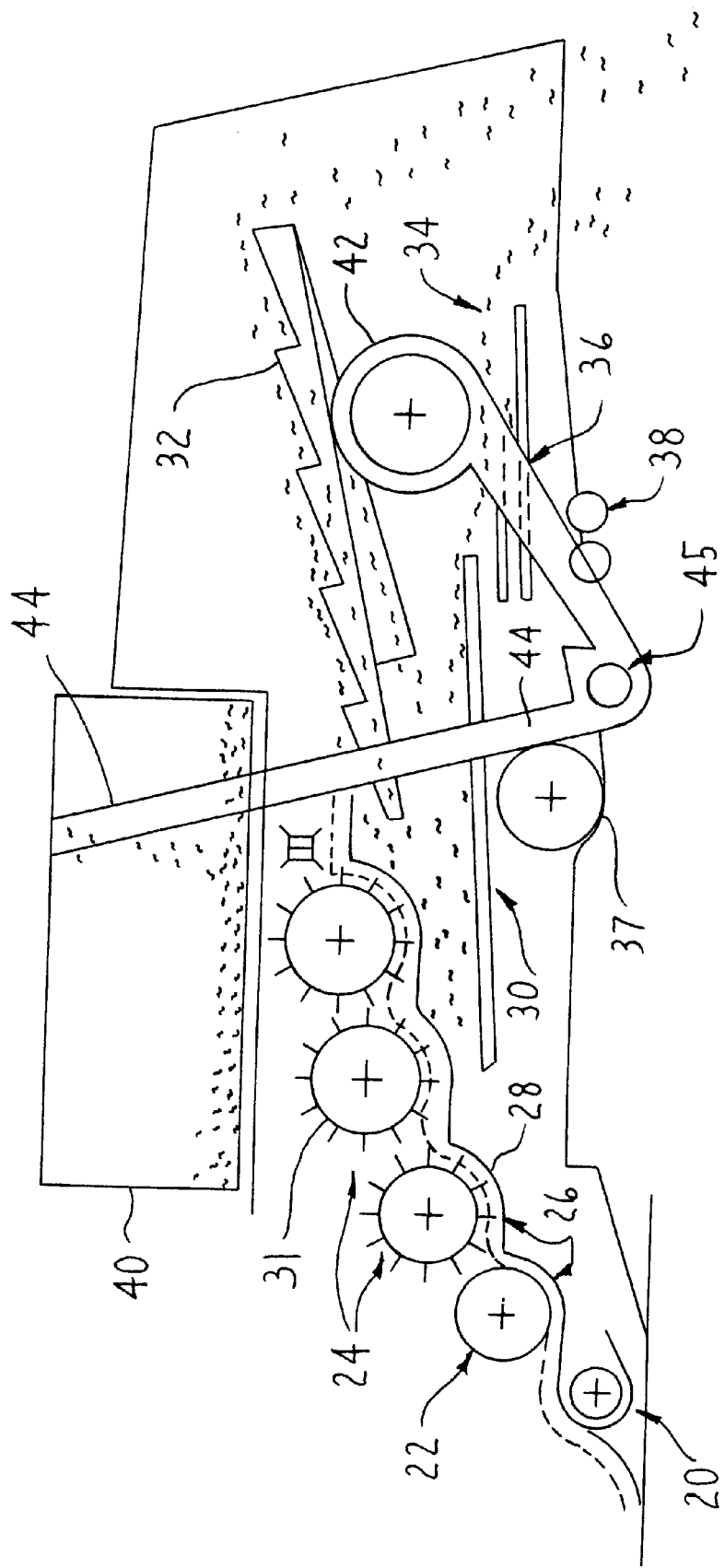
FIG. 5 is a schematic view of a peanut combine showing the straw walker, shaker pan, and air lift fan and other components.

As best shown schematically in FIG. 5, the peanut combine 10 includes a pickup reel 20 that feeds peanut plants to a feeder auger 22 into a series of threshing and separating sections comprising picking cylinders 24 that operate over concaves 26 to remove the peanut pods from the plant vines. Stripper bars 28 slow movement of vines. Most of the peanut pods fall through the concaves 26 onto the shaker pan 30. The material that does not fall through is transferred rearward by the picking cylinders 31 to a conventional reciprocating straw walker section 32, which typically comprises a reciprocating sieve where further separation takes place. The material that has fallen on the shaker pan 30 is conveyed rearward onto an oscillating chaffer 34 and sieve 36, or other type of separation device. Openings in the chaffer or other mechanism allow the peanut pods to fall through but retains the trash. As the material moves rearward, an air blast directed upward from cleaning fan 37 through the sieve aids in separating pods from small vine material and other foreign material. The peanut pods fall on stemmer saws 38 that remove the stems. Then, an air delivery system conveys the peanut pods to the storage or collection basket 40 disposed on the top of the combine. The air delivery system includes a large centrifugal air lift fan 42 and air duct 44 that receives the stemless pods from the stemmer saws and communicates to the basket 40. The pods are blown through the duct 44 into the collection basket 40. A laterally extending air duct 45, or alternately a delivery auger (not shown), can be used to convey the crop laterally in the combine to the air duct 44. The combine components described are present on the aforementioned model 3355 4 Row wide body peanut combine available from Kelley Manufacturing Company.

Figure 3:
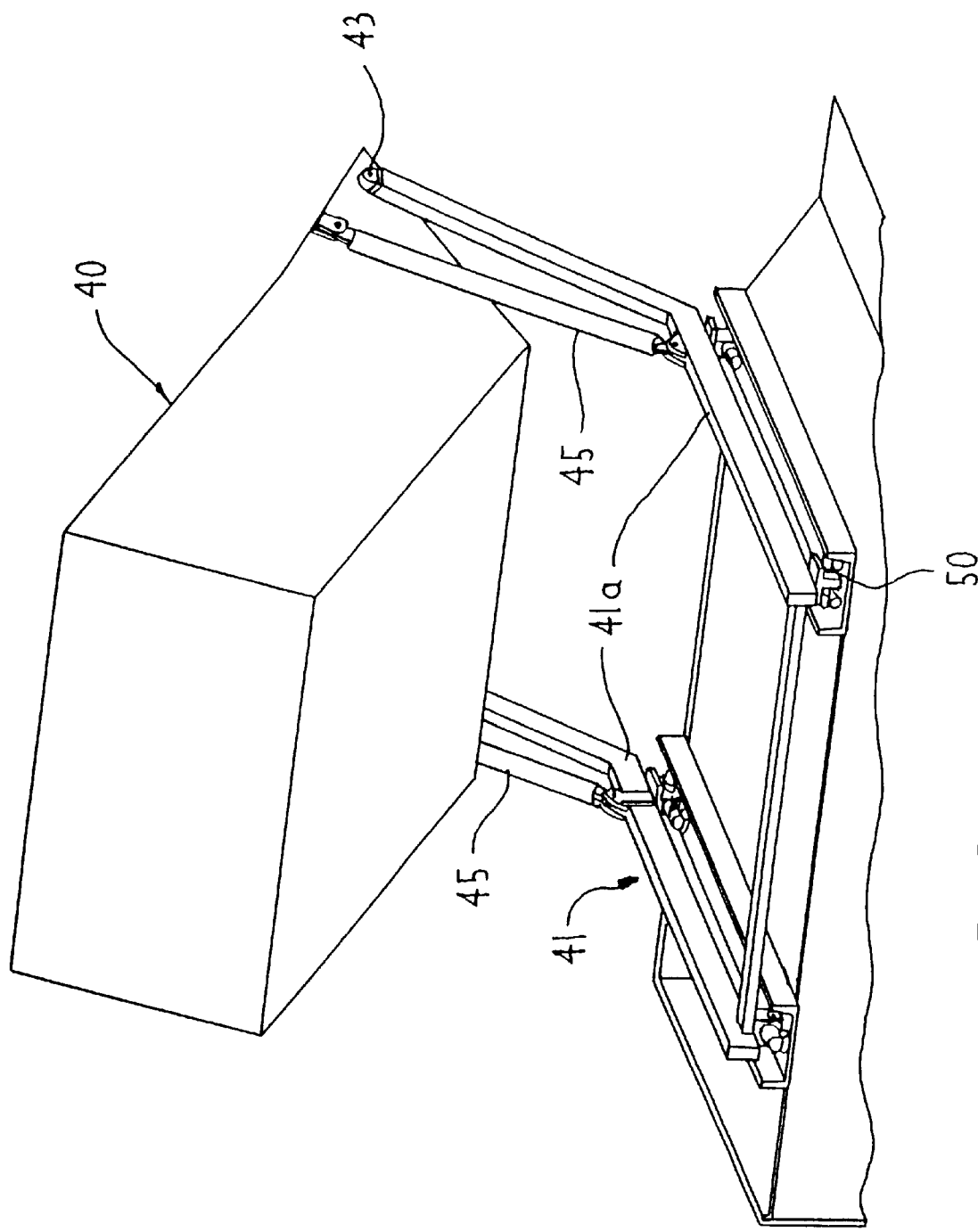
FIG. 3 is a somewhat schematic perspective view showing the collection basket, basket support frame, load cells on the top of the combine.

The collection basket 40 is shown schematically in FIG. 3 mounted on a support frame 41 comprising a pair of support arms 41a interconnected by a lateral support arm or member shown welded to the arms. The basket 40 is pivotally mounted on the support arms 41a by respective pivots 43 (one shown) at each arm so that the basket 40 can be tilted upwardly and rearwardly by hydraulic cylinders 45 as shown to discharge the harvested crop of peanuts pods over the rear wall 40a of the basket 40.

Figure 3A:
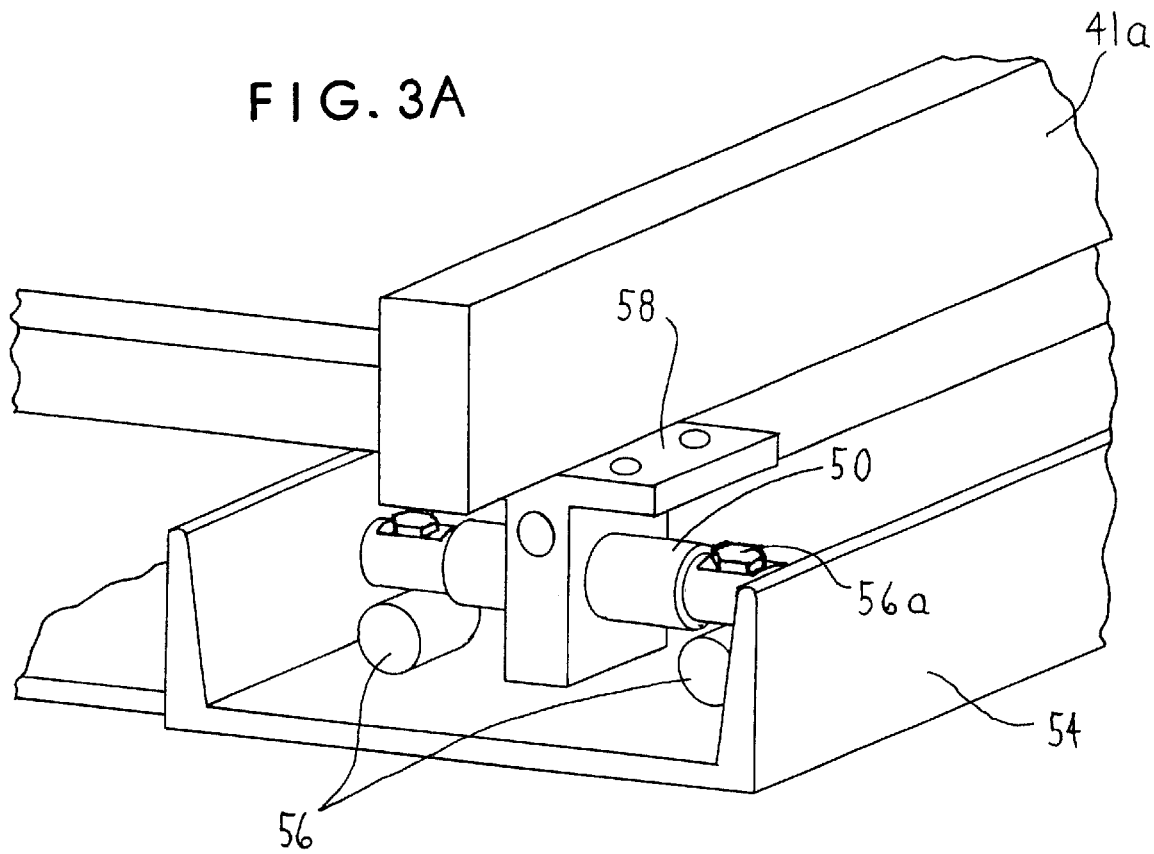
FIG. 3A is an enlarged view of the load cell in the channel.
Figure 4B:
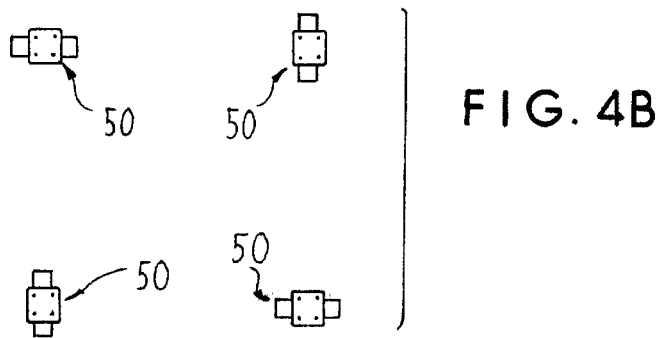
FIG. 4B is a schematic view of the arrangement of the load cells oriented in a pattern 90 degrees to one another.
Figure 4A:
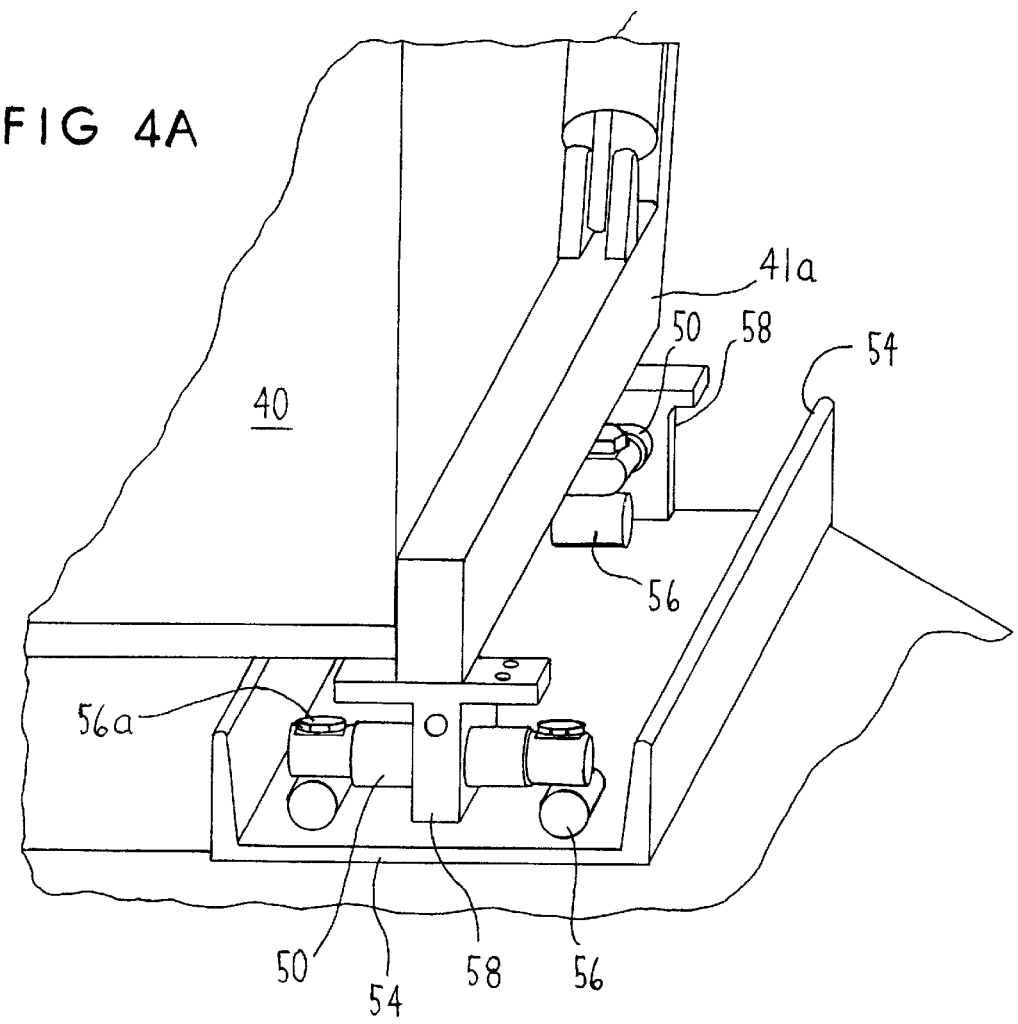
FIG. 4A is an enlarged perspective view of load cells in a support channel.

Pursuant to the invention, the support frame 41 of the collection basket 40 is mounted on load cells 50 located beneath the support arms 41a and beneath the respective lower corners of a generally rectangular base of the basket. Referring to FIGS. 3a, 4, and 4a, the load cells 50 are bolted in elongated structural steel C-shaped rigid channels 54 (e.g. 12 by 3.75 by 0.5 inches in dimension cut to length to extend across the top of the combine and slightly beyond. The channels 54 underlie each respective support arm 41a parallel thereto. The channels 54 in turn are bolted or otherwise affixed to the top of the combine 10.

The load cells 50 each comprise double ended shear beam load cells (center loaded) with a 2270 kg (5000 lb) capacity available as model 70000 from Rice Lake Weighing Systems, Rice Lake, Wis. The load cells 50 are each mounted in the respective channels 54 using the EZ Mount 1 Series Mounting Module Kit also available from Rice Lake Weighing Systems to eliminate binding at the mounts. In this mounting kit, the contact points between the load cell 50 and the center mount 58 are both rounded and free to rotate. The EZ Mount Kit includes a pair of shafts 56 having support surfaces on which the load cell 50 is mounted by bolts to the rigid channels. The center mount 58, FIG. 4A, connects each load cell to the basket support arm 41a thereabove. The load cells 50 typically are arranged in a "90 degree" pattern beneath the support arms 41a as schematically illustrated in FIG. 4B where adjacent load cells are oriented 90 degrees to one another.

The load cells 50 comprise analog sensors (strain gage load cells) providing an electrical output proportional to the weight of the collection basket 40. The load cells 50 can comprise 3 mV/V 350 ohm models with full scale output of 30 mV at 10 VDC excitation. These load cells 50 are oversized for safety reasons such that the effective output range for anticipated basket loading conditions is 0–20 mV.

Figure 2:
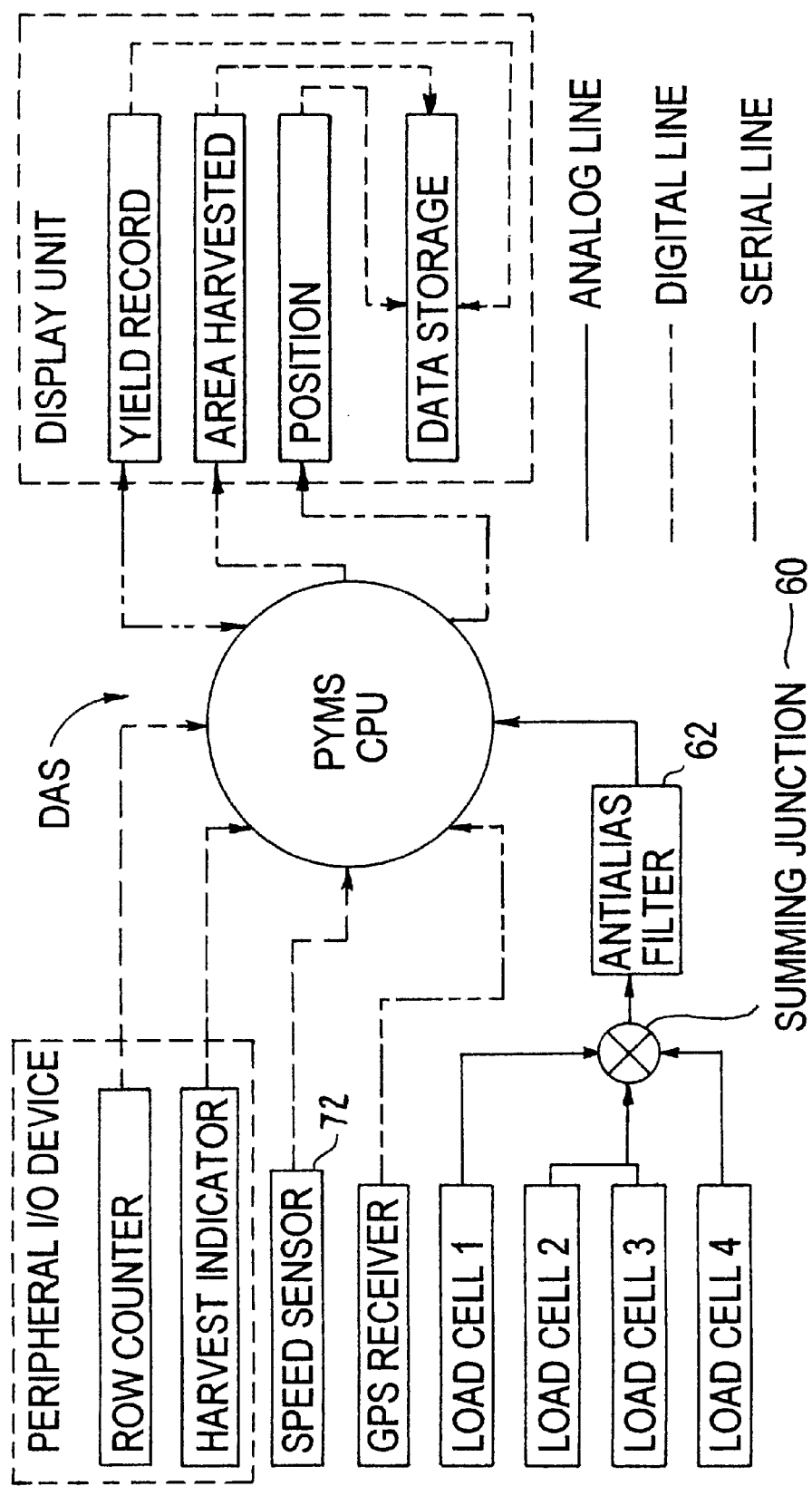
FIG. 2 is a diagram of the components of a peanut yield monitoring system in accordance with an embodiment of the invention.
Figure 8:
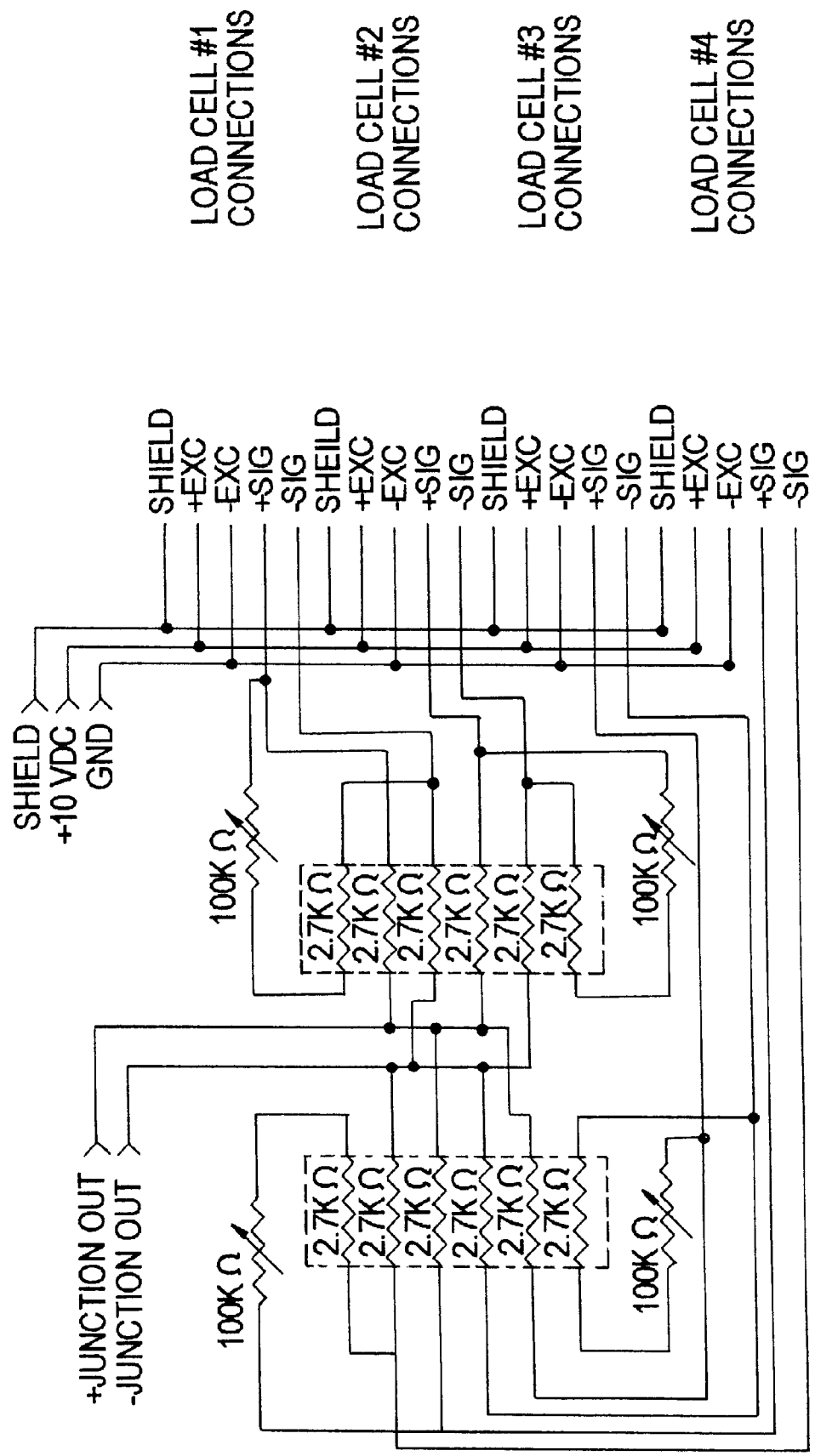
FIG. 8 is a diagram of the load cell summing junction circuit.
Figure 9:
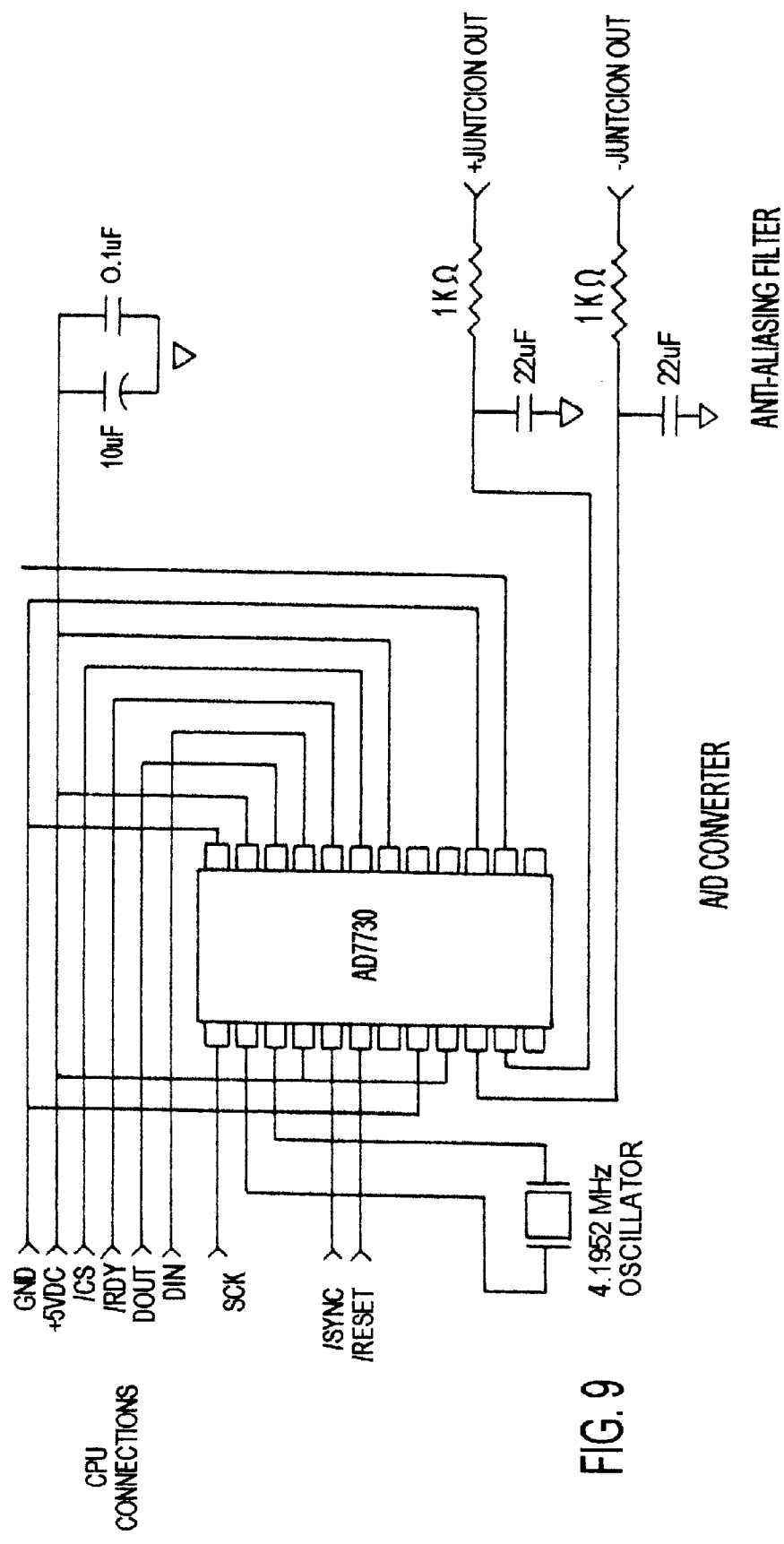
FIG. 9 is a diagram of the load cell output signal conditioning circuit.
Figure 10:
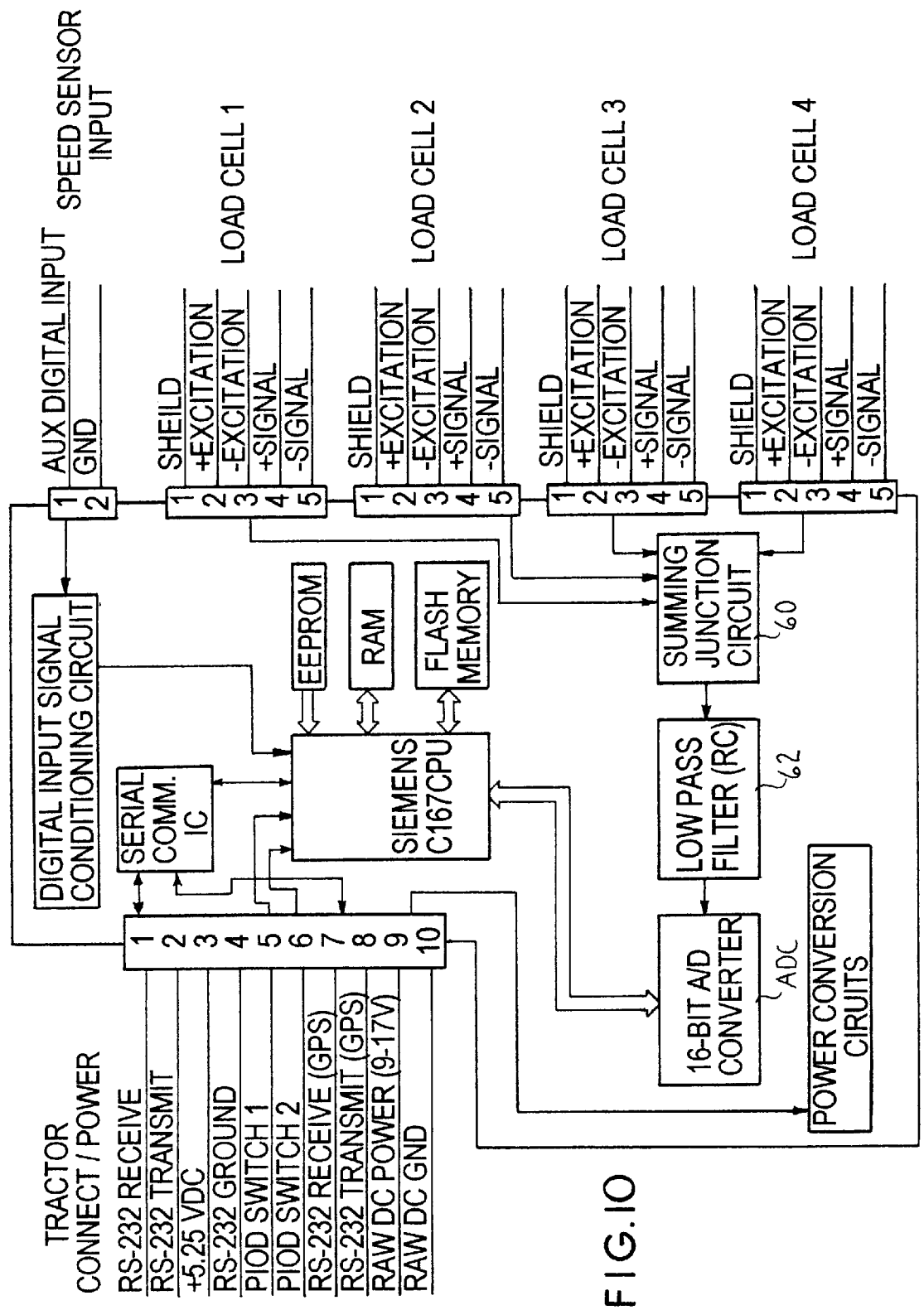
FIG. 10 is a diagram of a circuit board having the components of the peanut yield monitoring system thereon with actual component connections simplified or omitted for clarity.

Referring to FIG. 2, the load cells 50 are directly read by the peanut yield monitoring system data acquisition system (PYMDAS) via a common summing junction 60 and anti-aliasing low pass (RC) filter 62 disposed on a circuit board, FIG. 10, of the data acquisition system (DAS) of the yield monitoring system. The summing junction 60, FIG. 8, comprises a four channel signal trim junction box including resistor networks shown available commercially as Dale MPDP13-03 and trim potentiometers (pots) also shown available commercially as Bourns 3299w and that permits the respective load cell signals to be trimmed using potentiometers therein to equalize the output from the individual load cells for a given weight. The combined analog load cell signal (all four load cell signals are combined as an aggregate or summed signal) is then passed through antialias low pass (RC) filter 62 to the input of the analog-to-digital converter (ADC) of the data acquisition system (DAS). The filter 62 includes the resistors and capacitors shown in FIG. 9 arranged to function to remove noise created by harmonic vibration and distorting the combined or summed load cell signal and comprises common circuit components arranged to reject signals having frequencies greater than 10 Hz. The summing junction is connected to the anti-alias filter at the "junction out" connections of in FIGS. 8 and 9.

In addition to the summing junction 60 and anti-aliasing filter 62, the DAS includes a computer processor unit CPU including a Siemens C167 microprocessor chip, an external 16-bit analog-to-digital converter (ADC) such as the AD7730 chip available from Analog Devices, Norwood, Mass. and associated oscillator, and associated RAM (random access memory) chips, Flash Memory chips, EEPROM (electrically erasable programmable read only memory), and serial communication chips, all disposed on the circuit board, FIG. 10, mounted in a weatherproof enclosure on the combine 10 as illustrated schematically in FIG. 1. The RAM and Flash chips provide the CPU with working memory necessary for buffering and other digital filtering applications and are available as chip KM681000BLGI-7 from Samsung Electronics, LTD. and chip 20F01070 from Advanced Micro Devices, respectively. The EEPROM provides storage of the board software and essential working parameters (e.g. sensor calibration coefficients) and is available as chip 24CO1C from Microchip Technology Inc., Chandler, Ariz. The serial communications chips include an external UART (universal asynchronous receiver/transmitter) and a TTL/RS-232 translator. The UART handles the flow of RS-232 data from the GPS receiver and is available as chip MAX3100 from Maxim Integrated Products, Sunnydale, Calif. The TTL/RS-232 translator converts TTL-level signals into RS-232 information and is available as chip MAX232 from Maxim Integrated Products.

The tractor connect/input is connected to input terminals of the Siemens C167 microprocessor chip as illustrated in FIG. 10. The auxiliary digital input is connected via a digital input signal conditioning circuitry to input terminals of the Siemens C167 microprocessor chip as illustrated in FIG. 10. To protect the CPU and provide quality digital-level input signals, the speed sensor output is directed through a digital input signal conditioning circuit. This circuit is an NPN transistor switch that turns "on" when the input signal is between 2.7 and 30 VDC (maximum safe input) and "off" when the input signal is below 2.7 VDC. The output of the switch is a stable 5 or 0 VDC, according to the switch condition of the circuit.

The power conversion circuits comprise four DC/DC converters that provide excitation for board components, sensors, and the display unit. A 12VDC to 5VDC converter transforms the raw tractor power supply to a 5 W (Watt) supply for the circuit board's logic components and CPU, This component is available as chip LM2595S-5.0 from National Semiconductor. The second DC/DC converter transforms the 5VDC output of the first converter to 15VDC (1.8W) for powering analog components and is available as chip HL20RO5S15 from Power Convertibles Corporation, Tuscon, Ariz. The third DC/DC converter uses the raw tractor supply and provides a 5–10VDC (1.5A) variable power supply for the display unit. This component is available as chip LM317 from National Semiconductor. The final DC/DC converter uses the +15VDC output of the second converter to provide 10VDC excitation for the load cells as well as reference voltage from the ADC converter and is available as chip AD567 from Analog Devices.

The external ADC digitizes the analog output of the load cell summing junction circuit and communicates the result to the CPU. The CPU averages the digitized measurements over each sampling period (e.g. 1 second period) and then digitally filters the averaged measurements, and calculates the weight (yield) based on the filtered load cell output.

The load cell data is collected at 256 Hz (Hertz) to further protect against aliasing. The data points are averaged and stored at 1 Hz to match the DGPS data throughput to be described below.

The C167 microprocessor communicates with a data display/storage unit such as a Windows CE (v2.0) Palmtop Computer available as model HP360LX from Hewlett Packard and with a peripheral I/O device (PIOD). The HP360LX display/storage unit and the PIOD typically are located in the tractor cab, FIG. 1. The HP360LX display/storage unit provides visual feedback of the DAS via the computer screen to the tractor operator and stores acquired data.

The PIOD comprises a small switch box in the tractor cab, FIG. 1, that allows the tractor operator to manually input the number of rows of peanut plants being harvested. In particular, the PIOD includes a rotating switch that is operated at the initiation of harvesting rows of peanut plants and at the end of harvesting the rows to provide a so-called "pick flag" indicator signal to the CPU to tag or identify data collected and stored with respect to those rows harvested. The "pick flag" signal is used to remove data collected by the DAS when the combine 10 is not actually harvesting (e.g. during a dump of collected peanut pods or turning around at the end of a windrow). The number of rows harvested is communicated by the PIOD to the CPU according to the position of the rotating switch. Two communication leads are connected to the PIOD circuitry such that moving the switch to each of its positions produces a 2-bit binary count representing the number of rows being harvested (i.e. the number of windrows harvested by a 4-row combine would be either 0, 1 or 2). The two communication leads are connected to the DAS CPU as digital inputs, and the number of rows harvested is collected along with the load cell and position information received each sampling period (e.g. each second). The PIOD switch outputs are directed through respective input signal conditioning circuits to protect the CPU in a manner like that described above for the speed sensor input wherein each conditioning circuit comprises an NPN transistor switch that turns "on" when the input signal is between 2.7 and 30 VDC (maximum safe input) and "off" when the input signal is below 2.7 VDC and wherein the output of the transistor switch is a stable 5 or 0 VDC, according to the switch condition of each conditioning circuit.

The DAS is interfaced to a differential global positioning system (DGPS) receiver that provides time, latitude and longitude information of the tractor/combine 10 to the CPU via a serial input thereof. The receiver of the DGPS is disposed on the top of the tractor as shown in FIG. 1 for purposes of illustration and not limitation. A DGPS commercially available as model OS 7000 having 1–2 meter accuracy from Omnistar, Houston, Tex., can be used in practicing the invention and provides spatial/temporal reference data for use by the CPU in determining yield data. This DPGS is designed for agricultural use and comprises a single unit containing both the correction signal/antenna and an 8-channel GPS engine/antenna and all associated electronics. The DGPS data is provided at 1 Hz and is matched to the averaged load cell output, ground speed, and pick flag information for storage. While a serial cable is used for communication between the DGPS receiver and CPU, the raw tractor power supply is used to power the receiver.

A sensor 72 inputs digital signals representative of tractor axle rotation to the CPU. The sensor 72 can comprise a commercially available magnetic switch available as model 59025-010 from Hamlin, Inc. Lake Mills, Wis. The sensor 72 is mounted adjacent to the rear tractor axle as shown schematically in FIG. 1 so that the magnetic switch is cycled each time a magnet attached to the rotating axle passes the sensor's field of view. The CPU times each cycle and determines the tangential velocity of the wheel at the location of the magnet. The ground speed of the tractor is calculated using a calibration equation determined by a procedure in software.

Figure 5A:
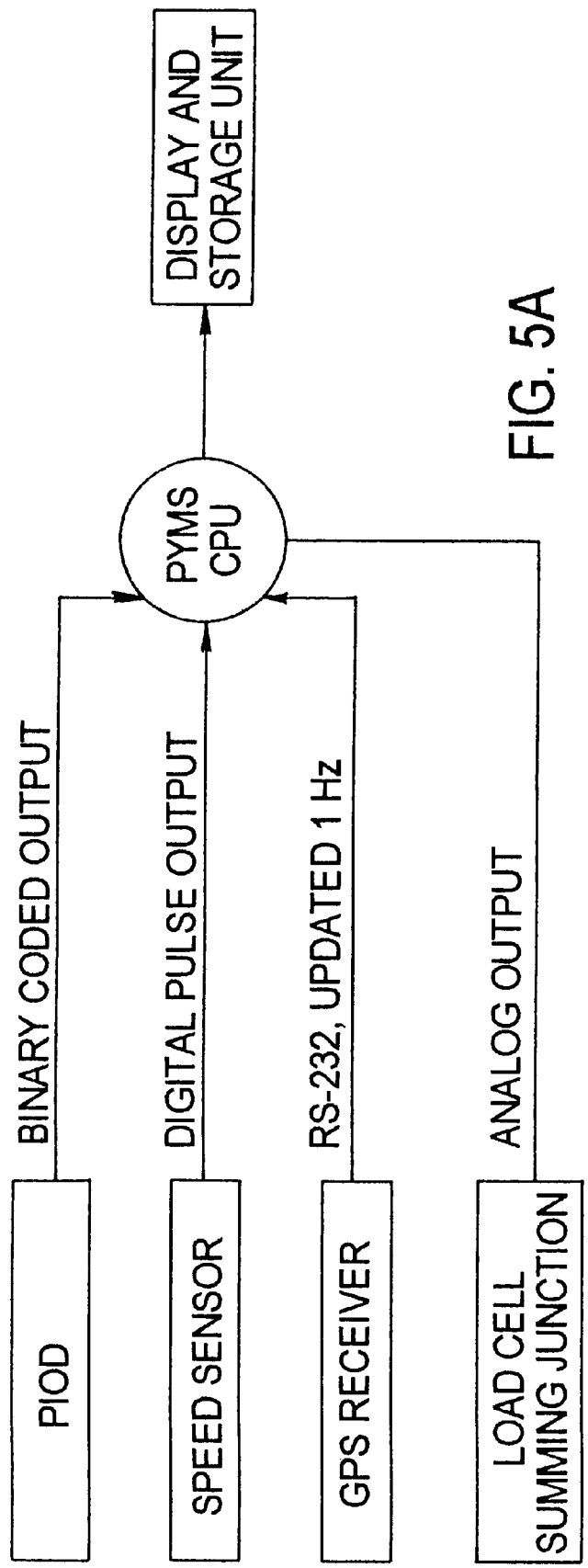
FIGS. 5A and 5B are data flow diagrams for the peanut yield monitoring system.

Referring to FIG. 5A, a schematic data flow diagram from the sensors/interface device described above to the CPU of the DAS is illustrated. As shown, the CPU receives analog output from the strain gage load cells 50 (via summing junction 60 and anti-alias filter 62). The DGPS 70 is connected to the CPU by a serial RS-232 line having an updated 1 Hz output. The sensor 72 provides a digital pulse output to the CPU. The PIOD provides a binary coded output to the CPU indicative of the number of rows harvested.

Figure 5B:
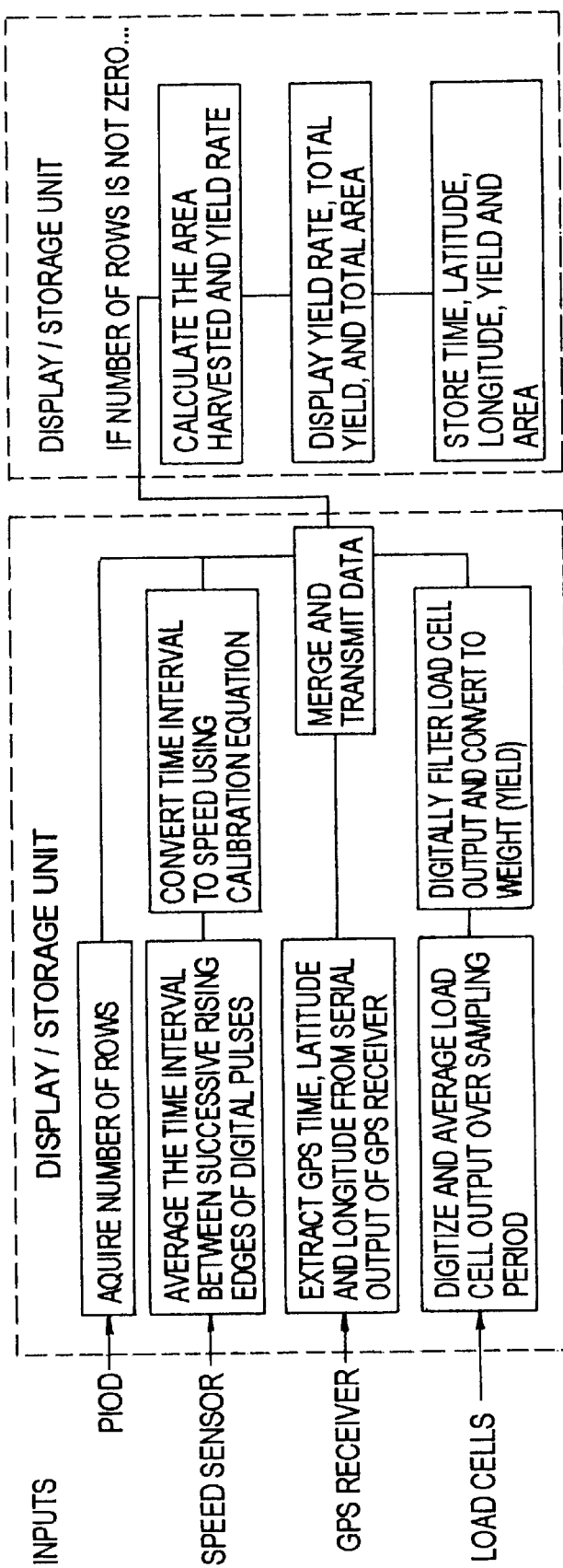

FIG. 5B illustrates operations performed by the CPU using MATLAB software available from The MathWorks Inc. In particular, the CPU digitizes and averages load cell output over the sampling period (every 1 second) The CPU digitally filters the load cell output and calculates a weight (yield) for the sampled data for each successive sampling period using the difference in filtered instantaneous weight between successive sampling periods. Dead load of the basket 40 is subtracted from yield by the software.

The monitoring system software includes a simple correction algorithm to adjust load cell output by a constant time lag resulting from the problem of delay, or lag, between the moment that the crop enters the combine and the moment that it is sensed. The constant time lag correction involves shifting the calculated yield values by a lag value between 11 and 15 seconds dependent upon the combine used so that the yield values are paired with the appropriate latitude and longitude coordinates. The time values collected from the DGPS receiver are used in this data shift. Experiments with a model 33 series 2-row peanut combine available from Kelley Manufacturing Company, Tifton, Ga., determined lag values by harvesting "pulses" of windrowed peanut plants whose length was equivalent to one second of travel of the combine. The resulting distribution of pods were collected and measured and, on average, an 11 second delay was observed between the harvest and sense events. This lag is compensated further by the distance between the head of the combine and the DGPS receiver on the tractor cab. To this end, an additional two seconds were added to the correction to give an integer value of 13 seconds for the time lag.

The averaged load cell output is digitally filtered to reduce signal noise resulting from harmonic vibration of the straw walker mechanism 32 which was discovered to be the predominant noise source in the load cell output signal data by analyzing combine dynamics for vibrations. The combine vibrations were discovered to be induced primarily by two mechanisms; namely, the main drive operating at 16.7 Hz and the straw walker mechanism operating at 4.7 Hz. Both of these were determined using an optical tachometer while the combine was running.

The dominant vibration frequencies affecting the load cells 50 were determined by running the combine and sampling an accelerometer and a load cell on the basket 40. The sensor output was sampled at 10 kHz. This data was processed with MATLAB mathematical analysis software from The Mathworks Inc,. Natick, Mass., to this end. The 4.7 Hz straw walker frequency. and integer multiples of 4.7 were pronounced in spectrum analysis results.

The CPU digitally filters the load cell output to reduce signal noise resulting from the harmonic vibration of the combine as well as random vibrations induced by field bumps. While classical FIR and IIR digital filters have been tested to remove the harmonic vibration noise, the combination of oversampling and averaging the load cell output has been found to be equally effective and substantially more efficient. Erroneous values remaining in the averaged load cell data set are subsequently removed with an 11 point median filter, FIG. 6, a nonlinear digital filter used to reject outliers in noisy data sets. Median filters are described by D. C. Montgomery et al. in "Forecasting and Time-Series Analysis, Second Edition", published by McGraw-Hill Inc. New York, N.Y., 1990, the teachings of which are incorporated herein by reference to this end.

The digital signal processing embodied in FIG. 6 is effective to provide an averaged load cell output having reduced noise from the straw walker harmonic vibrations and other vibrations related to normal field operation.

Referring again to FIG. 5B, the CPU extracts the DGPS time, latitude, and longitude data from the serial output of the DGPS receiver. The CPU determines speed of the combine based on data from the sensor 72 as described above and acquires the number of rows of peanut plants harvested from the PIOD. The CPU calculates the area harvested and the yield rate from the merged and transmitted data and displays the yield rate, total yield, and total area harvested on the HP360LX display/storage unit in the tractor cab, FIG. 1 to provide visual feedback of the DAS via the computer screen to the tractor operator.

Testing of the yield monitoring system has determined that yield measurements were within 2% on a per-wagon load basis and 1% on a whole field basis as compared to yield measurements determined using conventional truck weigh scale to weigh the tare and loaded weight of crop actually harvested and carried in a peanut wagon to the scale. Moreover, ground slopes of less than 2 degrees have been found not to affect load cell output significantly. In many peanut field situations and with larger combines, the slope would not be expected to exceed 2 degrees.

Figure 11:
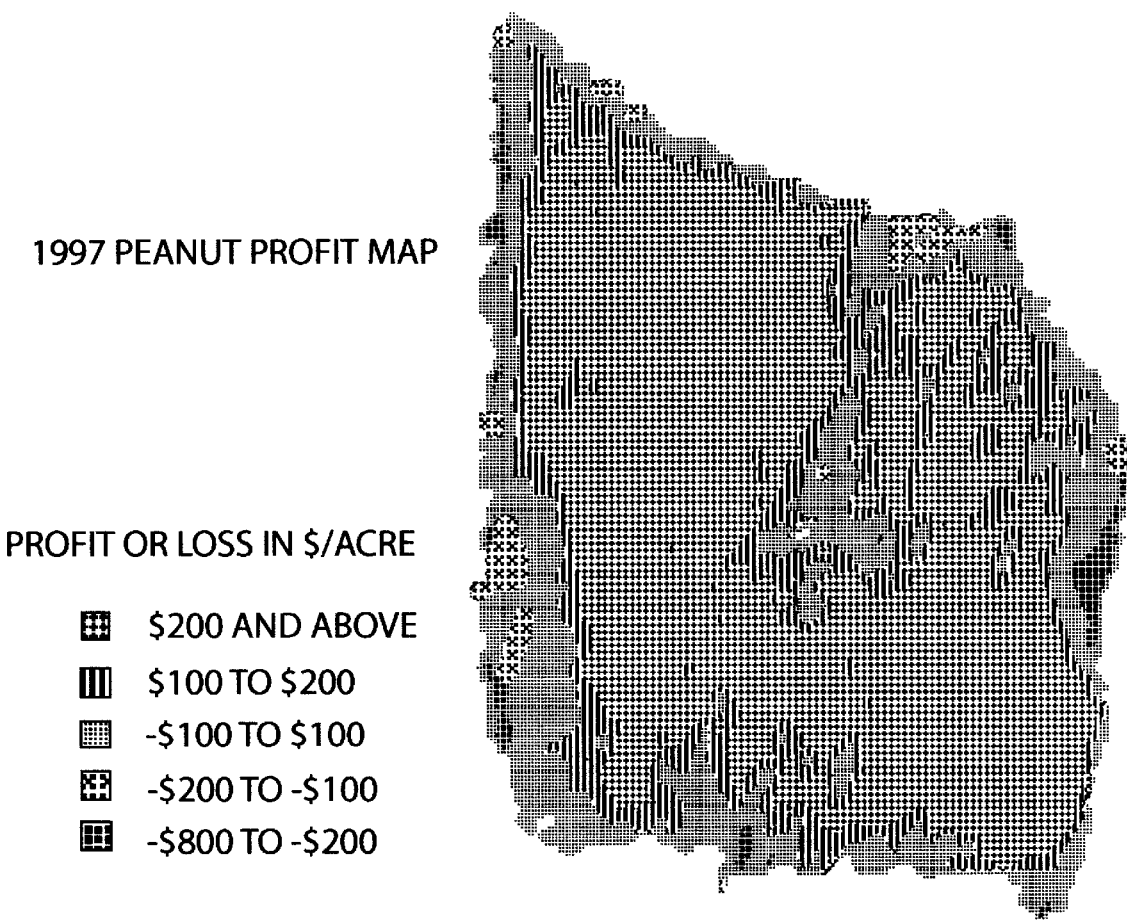
FIG. 11 is a peanut profit map created from the yield map of FIG. 12 by subtracting production costs from yield income for a particular harvested field.
Figure 12:
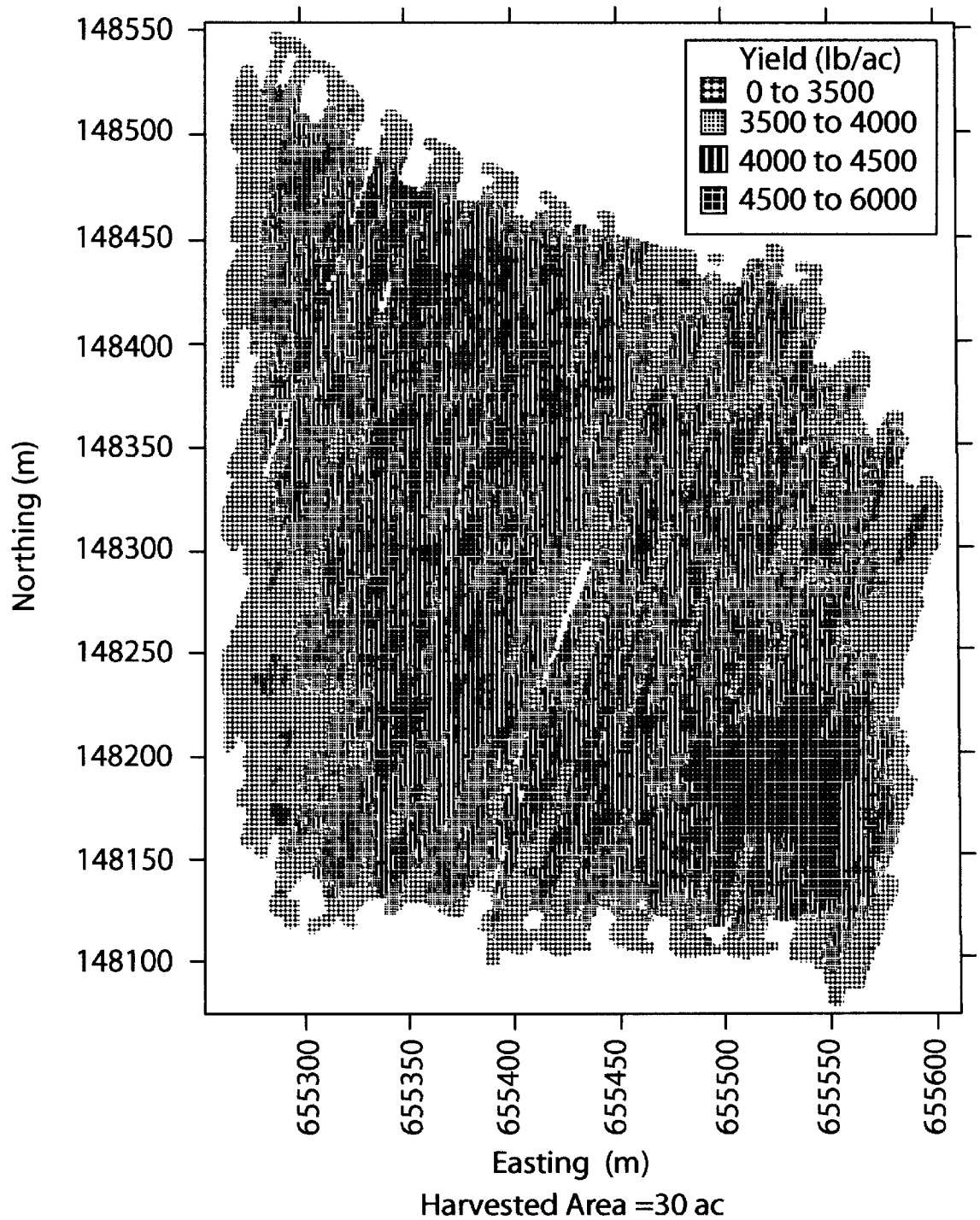
FIG. 12 is a peanut yield map from a harvested field.
Figure 13:
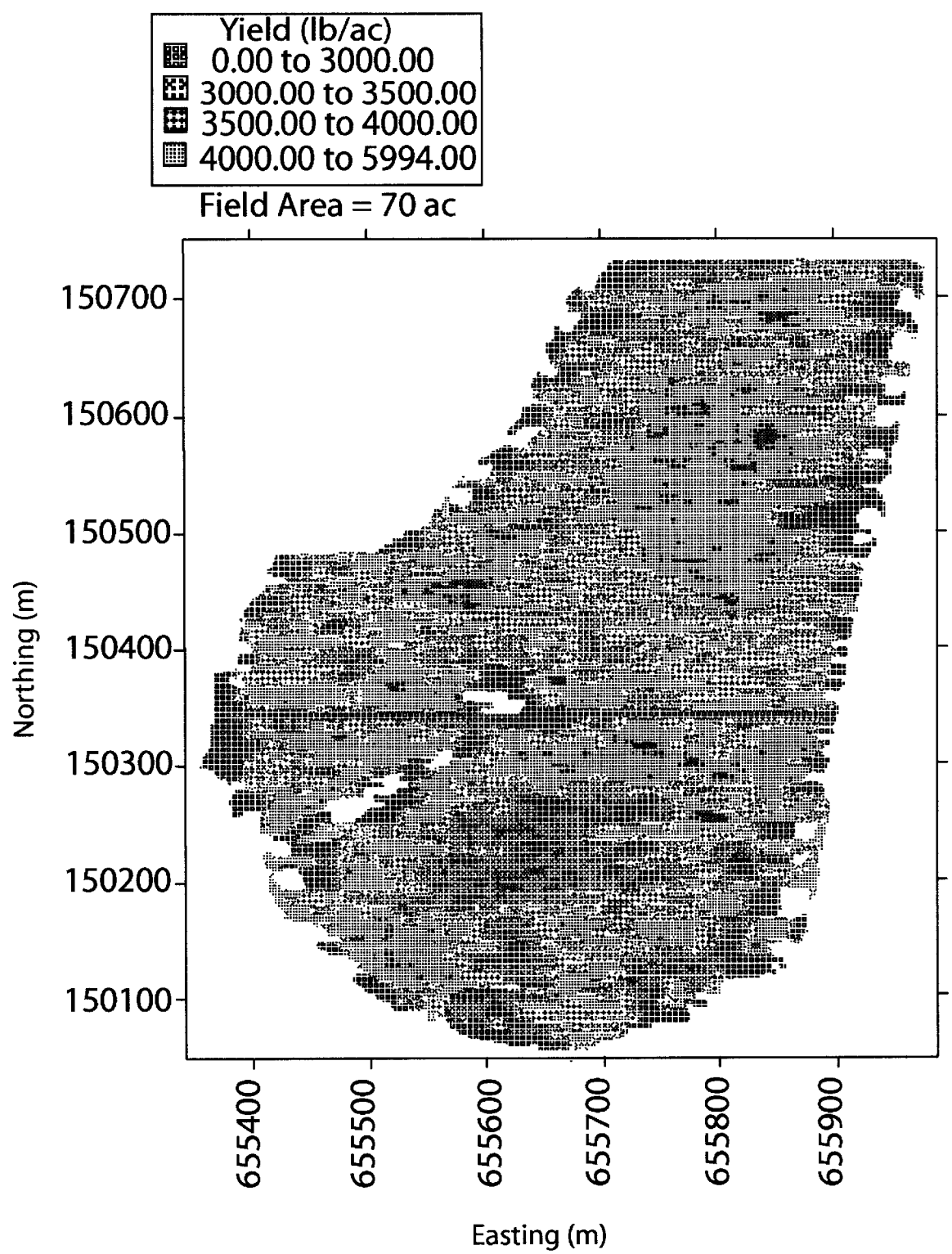
FIG. 13 is a peanut yield map from a different harvested field.

Classed post and contour yield maps of FIGS. 11, 12 and 13 were created with the Surfer mapping software available from Golden Software, Inc. Golden, Colo. To create the classed post maps of FIGS. 11 and 12, the yield data is divided into categories whose limits are defined by the user (e.g. from 0 to the maximum yield in increments of 500 pounds per acre). The categories are assigned colors or gray levels determined to be indicative of yield performance, the data are plotted using their respective latitude and longitude coordinates (or equivalent coordinate system such as state plane coordinates, as shown in FIGS. 11 and 12). Contour maps such as the profit map of FIG. 13 may be created by spatially interpolating the yield data onto a rectangular grid where each grid cell is assigned a value according to the yield data contained within the cell. Several methods of interpolation may be used such as the inverse distance weighting described in "Geostatistical Primer, Brooker, P. I. 1991, World Scientific Publishing, Teaneck, N.J. The profit map data was created by assigning expense or income values to yield and production costs (e.g. fertilizer application, water application, insecticides, labor, etc.) and then computing the net return for the field shown.

For example, FIG. 11 is peanut profit map created from the yield map of FIG. 12 by subtracting production costs from yield income for a particular harvested field using data provided by a yield monitoring system pursuant to the invention. FIG. 12 is a peanut yield map from the same harvested field as FIG. 11 using data from a yield monitoring system. FIG. 13 is a peanut yield map from a different harvested field using data from a yield monitoring system.

Although certain illustrative embodiments of the invention have been described and shown in detail, those skilled in the art will appreciate that the invention is not limited to these embodiments and that changes, modifications and the like can be made thereto within the scope of the invention as set forth in the appended claims.

We claim:

1. A yield monitoring system for a crop harvesting machine having a crop collection basket into which a harvested crop is conveyed, comprising:

at least one load cell disposed relative to said basket to provide an output representative of weight of said basket at any given time during harvesting of the crop, a data acquisition system including a computer processing unit that receives said output, a global positioning device that provides time, latitude and longitude information of said machine to said unit, a sensor that provides to said unit information from which speed of said machine can be determined, an interface device for providing information representative of the number of rows harvested to said unit, and said unit determining crop yield and area harvested as said crop is being harvested.

2. The system of claim 1 further including a visual display unit interfaced with said unit for displaying crop yield and area harvested as said crop is being harvested.

3. The system of claim 1 further including an anti-aliasing filter for the input of an analog-to-digital converter.

4. The system of claim 3 wherein said load cell output is converted to digital signals that are input to a summing device and to said anti-aliasing filter.

5. The system of claim 1 wherein a plurality of load cells are present and a respective load cell is disposed beneath a respective lower corner of a generally rectangular base of said basket.

6. The system of claim 5 wherein each said load cell mounted to be rotatable relative to said basket.

7. The system of claim 1 wherein said sensor is disposed on a towing tractor connected to said machine.

8. The system of claim 1 wherein said interface device comprises a manually operable device for inputting the number of crop rows harvested to said unit.

9. The system of claim 1 wherein said unit averages digitized load cell output over a sampling period, digitally filters the digitized load cell output and calculates the crop weight.

10. A peanut yield monitoring system for a peanut combine having a straw walker mechanism and air duct through which peanut pods are conveyed into a collection basket atop the combine, comprising:

a plurality of load cells disposed relative to said basket to provide analog output representative of weight of said basket at any given time during harvesting of the peanut crop, a data acquisition system including a computer processing unit that receives said analog load cell output and an analog to digital converter to convert said analog load cell output to digital output, said unit averaging said digital output and digitally filtering said digital output to reduce signal noise of said straw walker mechanism, a global positioning device that provides time, latitude and longitude information of said combine to said unit, a sensor that provides to said unit signals from which speed of said combine can be determined, an interface device for providing signals representative of the number of rows harvested to said unit, and said unit including means for determining peanut crop yield and area harvested as said peanut crop is being harvested.

11. The system of claim 10 wherein a respective load cell is disposed beneath a respective lower corner of a generally rectangular base of said basket.

12. The system of claim 11 wherein each said load cell is rotatable relative to said basket.

13. The system of claim 10 wherein said sensor is disposed on a towing tractor connected to said combine.

14. The system of claim 10 wherein said interface device comprises a manually operable device for inputting the number of crop rows harvested to said unit.

15. A method of monitoring yield of a crop during harvesting using harvesting machine having a crop collection basket into which a harvested crop is conveyed, comprising:

generating a load cell output representative of weight of said basket at any given time during harvesting of the crop, providing said load cell output to a computer processing unit, providing information relating to time, latitude and longitude of said machine to said unit, providing information to said unit from which speed of said machine can be determined, providing information representative of the number of rows harvested to said unit, and determining crop yield and area harvested using said unit as said crop is being harvested.

16. The method of claim 15 including visually displaying crop yield and area harvested as said crop is being harvested.

17. The method of claim 15 including inputting said load cell output to a summing device and to an anti-aliasing filter.

18. The method of claim 15 including positioning a respective load cell beneath a respective lower corner of a generally rectangular base of said basket.

19. The method of claim 15 wherein the number of crop rows harvested is input to said unit by an operator of said machine.

20. The method of claim 15 including converting said load cell output to digitized load cell output that is averaged over a sampling period, digitally filtered and from which crop weight is calculated.

* * * * *